(No Model.) 5 Sheets—Sheet 3.
M. H. HOWELL & E. C. SIMMONS.
MOLDING MACHINE FOR PLASTIC MATERIAL.
No. 419,676. Patented Jan. 21, 1890.

Witnesses
J. Henry Kaiser
Victor J. Evans

Inventor
M. H. Howell & E. C. Simmons
by Rogers & Cory
Attorney (No Model.) 5 Sheets—Sheet 4.

M. H. HOWELL & E. C. SIMMONS.
MOLDING MACHINE FOR PLASTIC MATERIAL.

No. 419,676. Patented Jan. 21, 1890.

Witnesses
J. Henry Kaiser.
Victor J. Evans.

Inventor
M. H. Howell & E. C. Simmons,
by Rogers & Cory
Attorney (No Model.) 5 Sheets—Sheet 5.

M. H. HOWELL & E. C. SIMMONS.
MOLDING MACHINE FOR PLASTIC MATERIAL.

No. 419,676. Patented Jan. 21, 1890.

ATTEST.
J. Henry Kaiser
A. M. Coyle

INVENTORS.
M. H. Howell & E. C. Simmons
per Rogers & Cory
their Attorneys.

UNITED STATES PATENT OFFICE.

MORGAN H. HOWELL AND ECKLEY C. SIMMONS, OF DUNNINGS, PENNSYLVANIA.

MOLDING-MACHINE FOR PLASTIC MATERIAL.

SPECIFICATION forming part of Letters Patent No. 419,676, dated January 21, 1890.

Application filed January 12, 1888. Serial No. 260,576. (No model.)

*To all whom it may concern:*

Be it known that we, MORGAN H. HOWELL and ECKLEY C. SIMMONS, citizens of the United States, residing at Dunnings, in the county of Lackawanna and State of Pennsylvania, have invented certain new and useful Improvements in Molding-Machines for Plastic Material; and we do declare the following to be a full, clear, and exact description of the invention, such as will enable others skilled in the art to which it appertains to make and use the same, reference being had to the accompanying drawings, and to the letters of reference marked thereon, which form a part of this specification.

The object of our invention is to mold expeditiously and economically receptacles for packing groceries and other substances, and to fashion pie-plates out of wet paper or similar plastic material, by means of a machine operated by a belt-pulley driven by any suitable power. The said machine has a revolving four-sided die working in connection with a plunger so arranged that as the die revolves and presents successively each of its four faces to a parallel plane the plunger is pressed into the die and stamps or molds the receptacle and lid at one operation. Thus at each quarter of the revolution of the shaft upon which the dies are secured a completed box, tray, or pie-plate or similar article is fashioned or molded whole.

Figure 1:
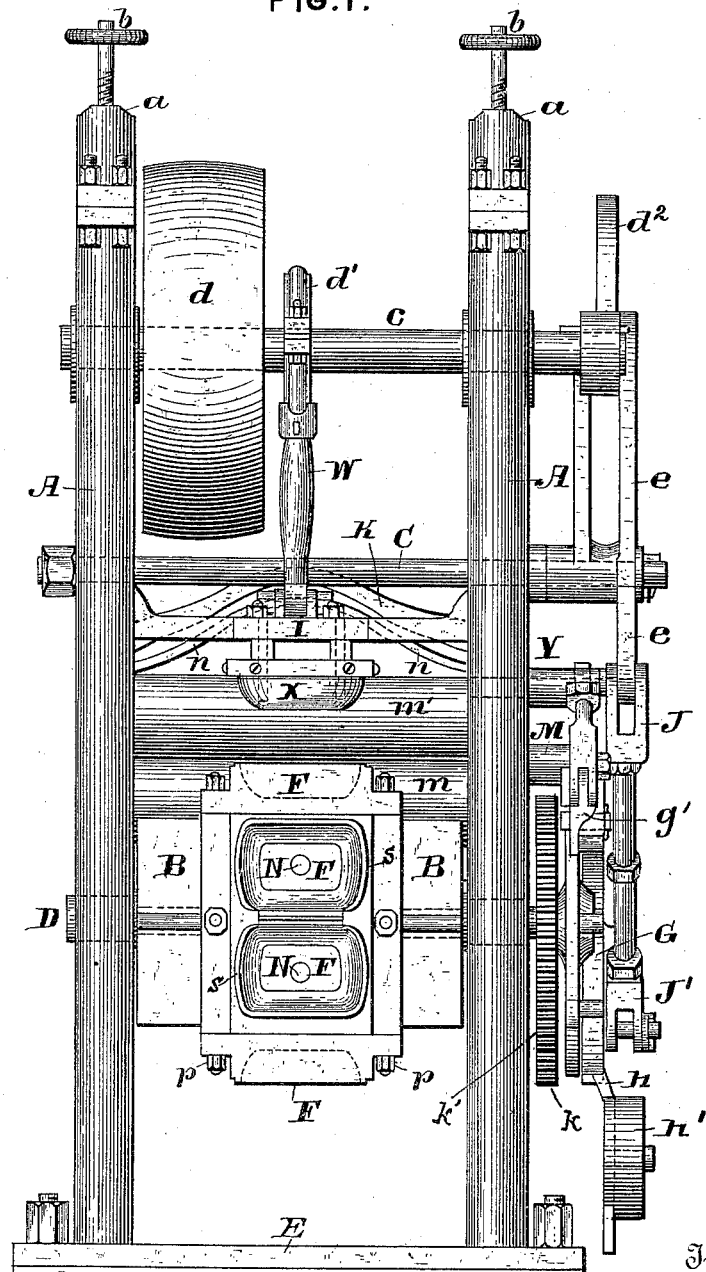
Figure 2:
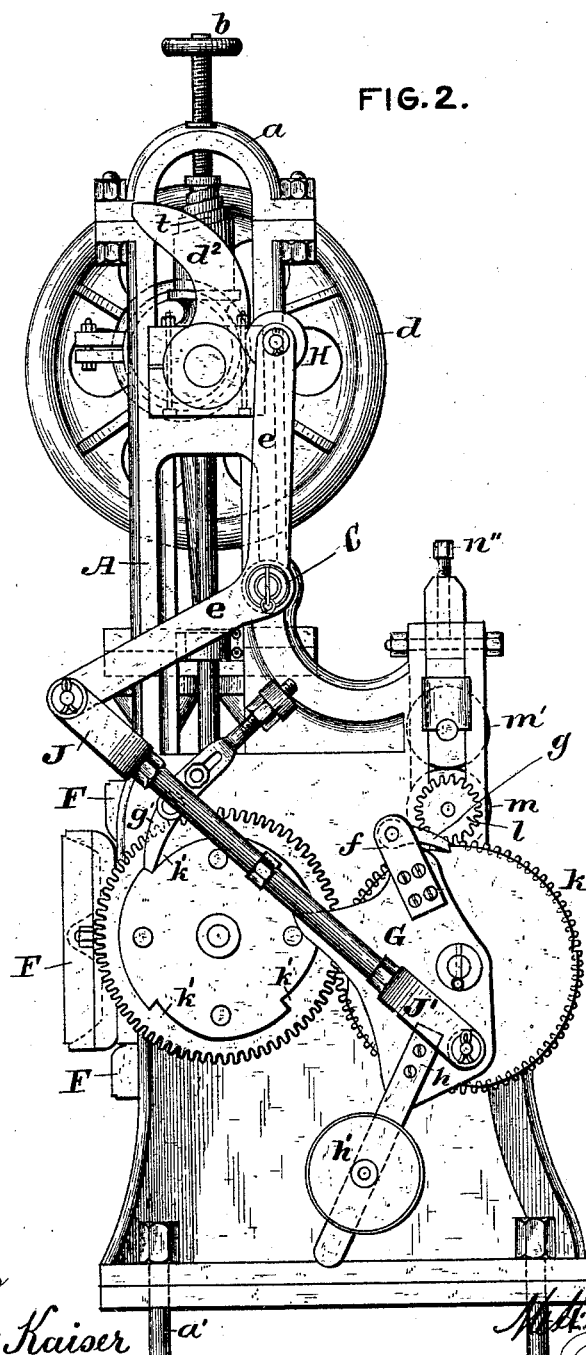
Figure 3:
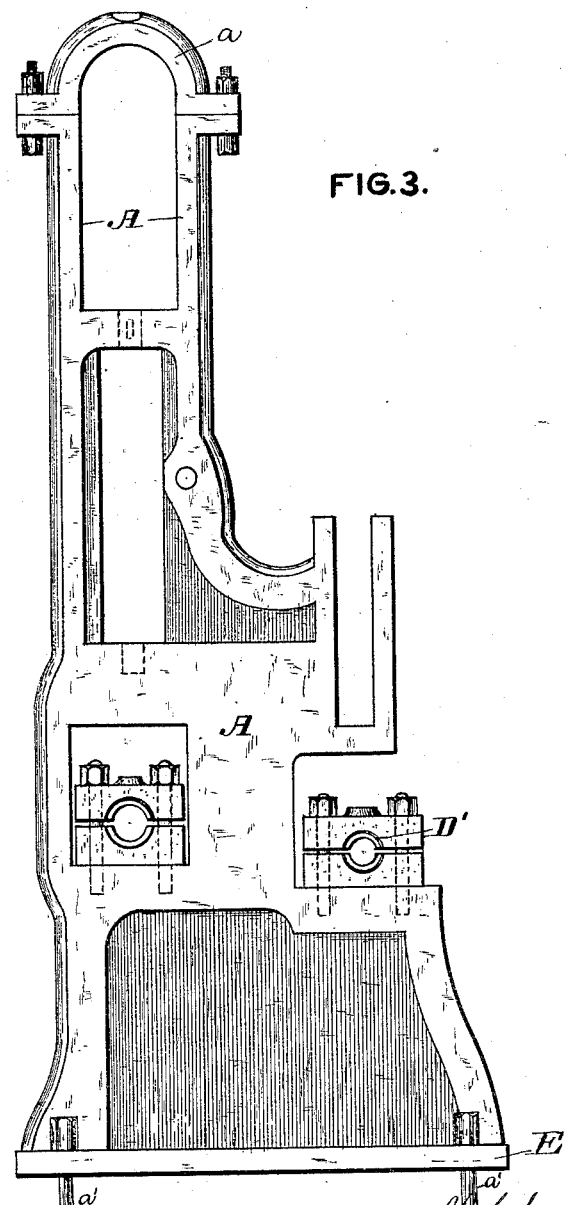
Figure 4:
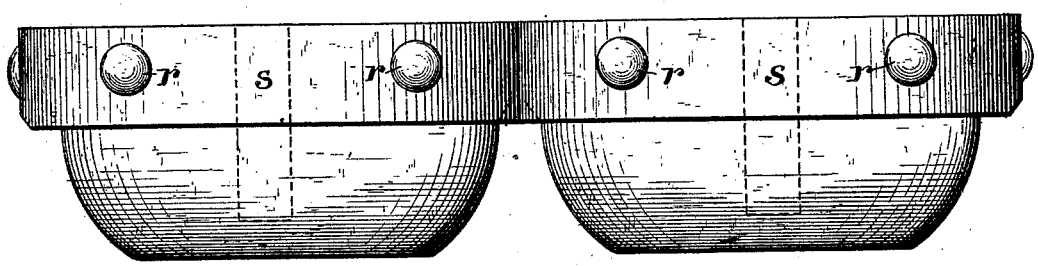
Figure 5:
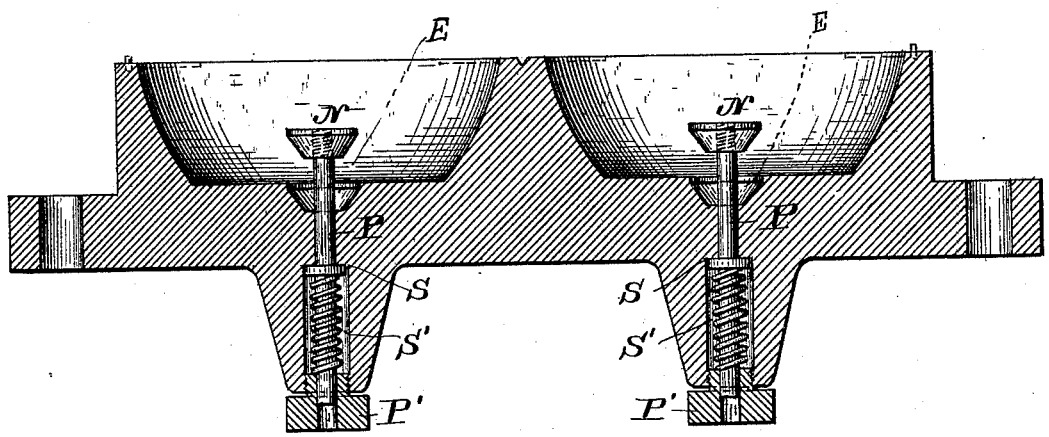
Figure 6:
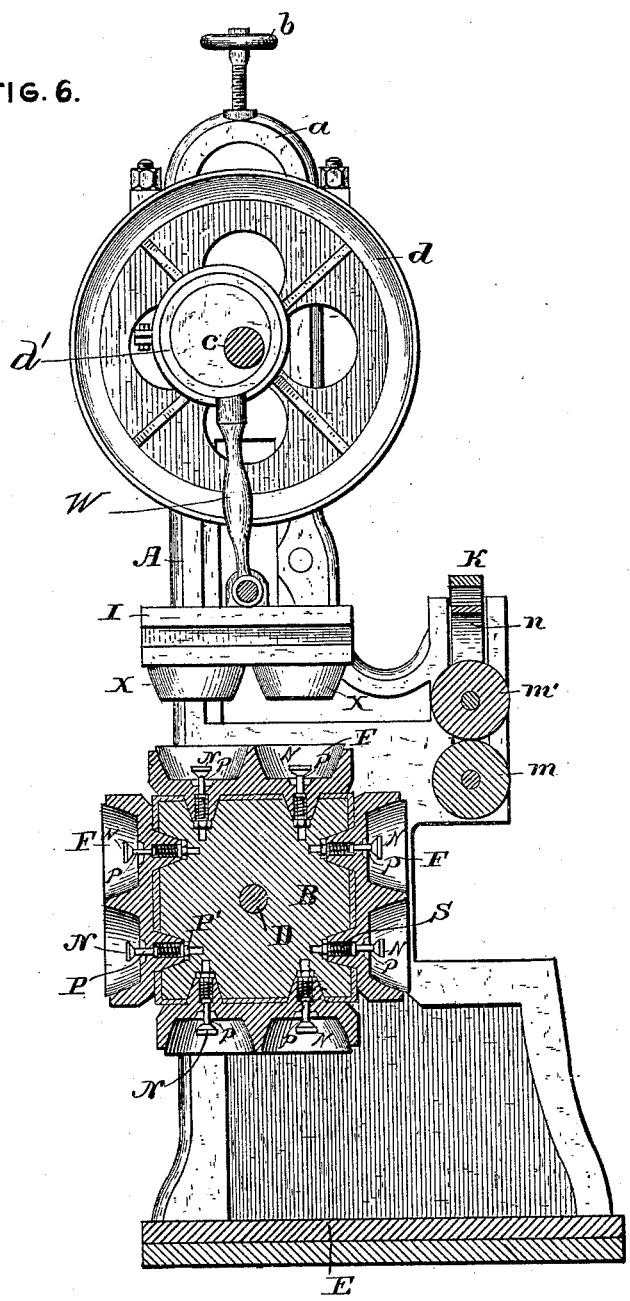

In the drawings, Figure 1 represents a front view of our machine; Fig. 2, a side view; Fig. 3, the iron frame and bearings for the shafts; Figs. 4 and 5, detailed views of the die, and Fig. 6 a sectional view of the machine.

A is the iron frame of the machine, which is provided with two upright sides, on the tops of which are bolted the semicircular plates $a$. Through the vertical center of the semicircular plates are located the hand-screws $b$, by means of which are operated the springs, which will be hereinafter described. The two vertical sides of the iron frame are slotted at the upper and lower ends for the reception of boxings for bearings and other portions of the operative parts of the machine.

E is the bed-plate of the iron frame of the machine, which may be suitably bolted to a platform or timbers by four bolts $a'$, passing through the bed-plate near each one of its outside four corners.

$c$ is a shaft journaled in bearings, upon which are fastened the belt-pulley $d$, the eccentric $d'$, and the cam-shaped lever $d^2$. The cam-shaped lever $d^2$ is keyed to the outer end of the shaft $c$, and the eccentric $d'$ is attached to the center of the shaft between the sides of the uprights A.

C is another shaft journaled in the sides of the upright iron frame below the shaft $c$ and bearing on its outer end the elbow-shaped arm $e$, the upwardly-projecting part of which is bifurcated. This arm carries at its upper end a friction-roller H, journaled in the bifurcated sides of the arm $e$, and is pivoted at its lower end to the link-rod J. This link-rod is pivoted to the lower part of the irregularly-shaped plate G, and is made adjustable in length by means of a male screw-thread cut upon its lower end and a female thread upon its socket J'. This adjustability is for the purpose of giving the proper length to the connection between the elbow-shaped arm and the plate G.

To the lower part of the irregularly-shaped plate G is secured, in a slot, the downwardly-extending arm $h$, which has secured upon it, by means of a set-screw, the adjustable weight $h'$. This weight $h'$ is made adjustable for the purpose of giving the proper amount of leverage to the elbow-shaped arm $e$ to keep its upper end in engagement with the cam-shaped lever $d^2$. Upon the upwardly-extended corner of the plate G is secured, in a slot in the said plate, the short upwardly-extended arm $f$, having pivoted in its upper end the pawl $g$.

$k$ is an idler gear-wheel meshing into $k'$, which is another gear-wheel keyed to the outer end of the shaft D, which bears the four-sided die.

Securely attached to the face of the gear-wheels $k$ and $k'$, and revolving coincidently with these wheels, are two ratchet-plates, each having four ratchets, into which the pawls $g$ and $g'$ take. The gear-wheel $k$ also meshes into the pinion $l$, which actuates the feed-rollers $m\ m'$, journaled in a slotted vertical opening in the front sides of the frame. Between these rollers pass the wet paper or plastic material out of which the box or other article is molded, which is conducted to the rollers by the ordinary aprons usually used in paper-making machines. (Not illustrated and not forming any part of this invention.) A sufficient amount of material is thus carried over the die and under the plunger to make the receptacle required. The rollers are held down by a bow-shaped spring $n$, the ends of which rest in the bearings for the upper roller $m'$. Above the spring is the curved arm K, having its ends securely bolted to the frame, and through it the set-screw $n''$ passes, the lower end of which impinges upon the bow-shaped spring $n'$, so that when it is found necessary to exert a greater or less pressure upon the rolls to govern the passage of the wet paper through them the screw may be screwed farther through the arm, so as to press down upon the roller; or the pressure may be lessened by turning the said screw out.

Upon the shaft D, which carries the gear-wheel $k'$, is rigidly attached the four-sided die, which consists of the cross-heads B, to which are bolted by the bolts $p$ the female dies F. Each face of the four-sided die consists of two cavities similar in shape and depth and having a longitudinal V-shaped groove or gully formed between them. The purpose of this construction is to form two similarly-shaped open boxes or receptacles of one piece of material and having the strip joining them together formed with a V-shaped groove, which facilitates the folding of one of the boxes upon the other and providing to the lower part of the receptacle a lid of the same shape as itself. Each cavity in the four-sided die is provided with an ejector consisting of the rod P, carrying the beveled head N and having the shoulder S, playing in the chamber S' and prevented from falling out by the nut P', which has an opening in it to allow rod P to descend when the wet paper is pressed into the cavity of the die.

Journaled upon the eccentric $d'$, which is keyed to the center of the shaft $c$, is the collar, to which is pivoted the downwardly-extended arm W, which at its lower end is pivoted by means of a bolt to the jaws upon the cross-head which carries the plunger X, to the upper edges of which are attached by means of screws the knives $s$, Fig. 4, the purpose of which is to cut away the wet paper that is pressed out of the die and which is not needed for the formation of the receptacle, and the said plunger is provided with the guide I, traveling in slotted bearings in the frame. In the outward side of the frame is the short arm Y, into the outer end of which is set the downwardly-extended arm having jaws at its lower end, into which is pivoted the pawl $g'$, which is so arranged that it takes into the ratchet-plate attached to the face of the gear-wheel $k'$, journaled upon the shaft that carries the dies, and one of the dies with its face presented upon a parallel plane for the reception of the plunger.

In order to regulate the pressure of the press, there is suitably constructed upon the shouldered standard which forms a part of the upper bearings of the shaft $c$ a volute spring $t$, so that the hand-screw $b$, passing through the extreme upper ends of the iron frame, impinges upon the spring, thus affording the means for regulating the pressure of the plunger.

The operation of our device is as follows: Upon a revolution of the belt-pulley the cam-shaped arm $d'$ upon its outer end presses upon the roller $H^2$, carrying the elbow-shaped lever outwardly at the top, which raises the lower end, to which is pivoted the rod J, which in its turn revolves the irregularly-shaped plate G, carrying the pawl $g$, that takes into the ratchet-plate attached to the gear-wheel $k$, thus giving the gear-wheel a quarter-revolution, and as the gear-wheel $k$ meshes into the gear-wheel $k'$ the cross-heads bearing the dies are also revolved one quarter-revolution. When the cam-shaped arm $d^2$ has pressed the roller out as far as the length of the arm permits, the weighted arm attached to the lower corner of the irregularly-shaped plate G causes the elbow-lever to resume the position it sustained before the cam pressed upon the roller, and the cam upon the end of the shaft $c$ revolves through the bifurcated opening in the upper end of the elbowed arm, so it is in position to again impinge upon the roller $H^2$. As the cam-shaped arm $d^2$ presses upon the roller $H^2$ the eccentric $d'$ revolves coincidently therewith, carrying down the arm and plunger, so that at the same instant that a die presents its face horizontally the plunger enters it, pressing into the die the wet paper which has been carried over it, and as the bifurcated arm flies back and the belt-pulley $d$ makes a half-revolution the plunger is carried out of the way, the shaft bearing the dies performs a quarter-revolution, and the ejector, as its spring is released, throws out the receptacle just formed.

We claim—

1. In a molding-machine, the combination of a plunger, means for depressing and raising the same, two or more female dies formed with cutting-edges, a shaft to which the female dies are attached, and means to intermittently revolve said shaft, substantially as described.

2. In a molding-machine, and in combination with a driving-shaft, a plunger, and means for depressing and raising the same in a vertical plane, suitable feed-rollers, a series of female dies, and devices connecting said driving-shaft with the feed-rollers and dies, whereby they may be intermittently rotated coincidently, substantially as described.

3. In a molding-machine, and in combination with a plunger and means for depressing and raising the same in a vertical plane, a driving-shaft provided with a cam, a lever to be engaged by said cam, a pair of feed-rollers, a pawl-and-ratchet mechanism, a many-sided female die, and connections between the pawl and ratchet and the said lever and die, whereby they may operate coincidently, substantially as described.

4. In a molding-machine, the combination of a driving-shaft provided with an eccentric and a cam-shaped arm, a plunger adapted to be actuated by said eccentric, a lever, a pair of feed-rollers, a pawl suitably supported and connected to said lever, a ratchet-plate to operate said rollers, a many-sided female die, and gearing, substantially as described, whereby the whole may operate together.

5. A molding-machine comprising, in combination, a driving-shaft provided with an eccentric and a cam-shaped arm, a plunger to be actuated by said eccentric, an elbow-shaped lever, a pawl connected to said lever, a ratchet, a pair of feed-rollers, a many-sided female die, and connections, substantially as described, whereby the oscillations of the lever shall rotate coincidently the feed-rollers and the die.

In testimony whereof we affix our signatures in presence of two witnesses.

MORGAN H. HOWELL.
ECKLEY C. SIMMONS.

Witnesses:
ANTH. BAUMAN,
L. WEHLAN.